US009637382B2

(12) United States Patent  
Noyes

(10) Patent No.: US 9,637,382 B2  
(45) Date of Patent: *May 2, 2017

(54) METHODS FOR PRODUCING SOLID CARBON BY REDUCING CARBON DIOXIDE

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/806,401

(22) Filed: Jul. 22, 2015

(65) Prior Publication Data

US 2015/0321918 A1  Nov. 12, 2015

Related U.S. Application Data

(63) Continuation of application No. 14/389,600, filed as application No. PCT/US2013/000077 on Mar. 15, 2013, now Pat. No. 9,090,472.

(60) Provisional application No. 61/624,723, filed on Apr. 16, 2012.

(51) Int. Cl.
| | | |
|---|---|---|
| *C01B 31/02* | (2006.01) | |
| *C01B 5/00* | (2006.01) | |
| *C01B 31/18* | (2006.01) | |
| *B82Y 30/00* | (2011.01) | |
| *B82Y 40/00* | (2011.01) | |

(52) U.S. Cl.  
CPC .............. *C01B 31/02* (2013.01); *B82Y 30/00* (2013.01); *B82Y 40/00* (2013.01); *C01B 5/00* (2013.01); *C01B 31/0226* (2013.01); *C01B 31/18* (2013.01)

(58) Field of Classification Search  
CPC ...................................................... C01B 31/02  
See application file for complete search history.

(56) References Cited

U.S. PATENT DOCUMENTS

| | | |
|---|---|---|
| 1,478,730 A | 12/1923 | Brownlee |
| 1,735,925 A | 11/1929 | Jaeger |
| 1,746,464 A | 2/1930 | Fischer et al. |
| 1,964,744 A | 7/1934 | Odell |
| 2,404,869 A | 7/1946 | Sorrentino |
| 2,429,980 A | 11/1947 | Allinson |
| 2,440,424 A | 4/1948 | Wiegand et al. |
| 2,796,331 A | 6/1957 | Kauffman et al. |
| 3,172,774 A | 3/1965 | Diefendorf |
| 3,378,345 A | 4/1968 | Bourdeau et al. |
| 3,634,999 A | 1/1972 | Howard et al. |
| 3,846,478 A | 11/1974 | Cummins |
| 3,905,748 A | 9/1975 | Cairo et al. |
| 4,126,000 A | 11/1978 | Funk |
| 4,200,554 A | 4/1980 | Lauder |
| 4,602,477 A | 7/1986 | Lucadamo et al. |
| 4,663,230 A | 5/1987 | Tennent |
| 4,710,483 A | 12/1987 | Burk et al. |
| 4,727,207 A | 2/1988 | Paparizos et al. |
| 5,133,190 A | 7/1992 | Abdelmalek |
| 5,149,584 A | 9/1992 | Baker et al. |
| 5,413,866 A | 5/1995 | Baker et al. |
| 5,456,897 A | 10/1995 | Moy et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,726,116 A | 3/1998 | Moy et al. |
| 5,747,161 A | 5/1998 | Iijima |

(Continued)

FOREIGN PATENT DOCUMENTS

| | | |
|---|---|---|
| EP | 945402 A1 | 6/2003 |
| EP | 2186931 A1 | 5/2010 |

(Continued)

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

(Continued)

*Primary Examiner* — Stuart Hendrickson  
(74) *Attorney, Agent, or Firm* — TraskBritt, P.C.

(57) ABSTRACT

A two-stage reaction process includes reacting gaseous carbon dioxide with a reducing agent to form carbon monoxide and water. At least a portion of the water is condensed to form a dry tail gas. The dry tail gas, with the possible addition of a reducing agent, reacts to convert at least a portion of the carbon monoxide to solid carbon and water. Other methods include reacting a feed gas mixture to form a reaction mixture, condensing water from the reaction mixture to form a dried reaction mixture, mixing the dried reaction mixture with a recirculating gas to form a catalytic converter feed gas mixture, flowing the catalytic converter feed gas mixture through a catalytic converter to form solid carbon and a tail gas mixture containing water, and flowing the tail gas mixture through a heat exchanger.

20 Claims, 4 Drawing Sheets

(56) References Cited

U.S. PATENT DOCUMENTS

| | | |
|---|---|---|
| 5,780,101 A | 7/1998 | Nolan et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B2 | 8/2006 | Li et al. |
| 7,097,820 B2 | 8/2006 | Colbert et al. |
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,282 B2 | 9/2011 | Choi et al. |

(56) References Cited

U.S. PATENT DOCUMENTS

| | | |
|---|---|---|
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,679,444 B2 | 3/2014 | Noyes |
| 9,090,472 B2 | 7/2015 | Noyes |
| 2001/0009119 A1 | 7/2001 | Murray et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2003/0059364 A1 | 3/2003 | Prilutskiy |
| 2003/0147802 A1 | 8/2003 | Smalley et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0141346 A1 | 6/2006 | Gordon et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132883 A1 | 6/2010 | Burke et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |

(56) References Cited

U.S. PATENT DOCUMENTS

| | | |
|---|---|---|
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2014/0021827 A1 | 1/2014 | Noyes |
| 2014/0141248 A1 | 5/2014 | Noyes |
| 2015/0059527 A1 | 3/2015 | Noyes |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0078981 A1 | 3/2015 | Noyes |
| 2015/0078982 A1 | 3/2015 | Noyes |
| 2015/0086468 A1 | 3/2015 | Noyes |
| 2015/0147259 A1 | 5/2015 | Noyes |

FOREIGN PATENT DOCUMENTS

| | | |
|---|---|---|
| JP | 3339339 B2 | 10/2002 |
| JP | 2004517789 A | 6/2004 |
| JP | 2004360099 A | 12/2004 |
| JP | 2005075725 A | 3/2005 |
| JP | 2005532976 A | 11/2005 |
| JP | 2007191840 A | 8/2007 |
| KR | 1020050072056 A | 7/2005 |
| WO | 0230816 A1 | 4/2002 |
| WO | 03018474 A1 | 3/2003 |
| WO | 2004096704 A2 | 11/2004 |
| WO | 2005103348 A1 | 11/2005 |
| WO | 2006003482 A2 | 1/2006 |
| WO | 2006130150 A2 | 12/2006 |
| WO | 2007086909 A2 | 8/2007 |
| WO | 2007126412 A2 | 11/2007 |
| WO | 2007139097 A1 | 12/2007 |
| WO | 2009011984 A1 | 1/2009 |
| WO | 2009122139 A1 | 10/2009 |
| WO | 2009145959 A1 | 12/2009 |
| WO | 2010047439 A1 | 4/2010 |
| WO | 2010087903 A1 | 8/2010 |
| WO | 2010124258 A2 | 10/2010 |
| WO | 2010146169 A2 | 12/2010 |
| WO | 2011009071 A1 | 1/2011 |
| WO | 2011020568 A1 | 2/2011 |
| WO | 2011029144 A1 | 3/2011 |
| WO | 2011053192 A1 | 5/2011 |
| WO | 2014011631 A1 | 1/2014 |
| WO | 2014085378 A1 | 6/2014 |

OTHER PUBLICATIONS

Database WPI Week 198920 Thomson Scientific, London, GB; AN 1989-148422 XP002719593, & JP H01 92425 A (Nippon Kokan KK) Apr. 11, 1989 (Apr. 11, 1989).

Cha, S. I., et al., "Mechanical and electrical properties of cross•linked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98__APL__72__3282-ChengH M.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO—H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al., Carbon Nanotubes Synthesis, Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.

Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_19710002858.

Huang, Z.P., et al., "Growth of highly oriented carbon nanotubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Unknown author, "Metal Dusting," unknown publisher, undated.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Archit, "Effect of Gas Composition and Carbon Activity on the Growth of Carbon Nanotubes," Masters Thesis, University of Florida, 2003.

Unknown author, "Metal Dusting of reducing gas furnace HK40 tube," unknown publisher, undated.

Manning, Michael Patrick, "An Investigation of the Bosch Process," PhD Dissertation, Massachusetts Institute of Technology, Jan. 1976.

Muller-Lorenz and Grabke, Coking by metal dusting of steels, 1999, Materials and Corrosion 50, 614-621 (1999).

SAE 820875 Utilization of Ruthenium and Ruthenium-Iron Alloys as Bosch Process Catalysts. Jul. 19-21, 1982.

SAE 911451 Optimization of Bosch Reaction, Jul. 15-18, 1991.

Nasibulin, Albert G., et al., "An essential role of C02 and H20 during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://

(56) References Cited

OTHER PUBLICATIONS www.intechopen.com/books/nanofibers/synthesis-of-alumina•nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during C02 Reforming of CH4 over Co/?-Al203 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj__files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Wei, et al. "The mass production of carbon nanotubes using a nano-agglomerate fluidized bed reactor: A multiscale space-time analysis," Powder Technology 183 (2008) 10-20, Elsevier.

Zeng, Z., and Natesan, K., Relationship between the Growth of Carbon Nanofilaments and Metal Dusting Corrosion, 2005, Chem. Mater. 2005, 17, 3794-3801.

PCT International Search Report and Written Opinion, PCT/US2013/000077, dated Jul. 12, 2013.

METHODS FOR PRODUCING SOLID CARBON BY REDUCING CARBON DIOXIDE

CROSS-REFERENCE TO RELATED APPLICATIONS

This application is a continuation of U.S. patent application Ser. No. 14/389,600, filed Sep. 30, 2014, U.S. Pat. No. 9,090,472, which is a national phase entry under 35 U.S.C. §371 of International Patent Application PCT/US2013/000077, filed Mar. 15, 2013, designating the United States of America and published in English as International Patent Publication WO 2013/158160 A1 on Oct. 24, 2013, which claims the benefit of the filing date of U.S. Provisional Patent Application Ser. No. 61/624,723, filed Apr. 16, 2012, the disclosure of each of which is hereby incorporated herein in its entirety by this reference.

TECHNICAL FIELD

Embodiments of the disclosure relate to the conversion of a carbon-containing feedstock into solid carbon and more specifically, to methods of converting mixtures containing carbon monoxide, carbon dioxide, or combinations thereof to solid carbon of various morphologies.

BACKGROUND

U.S. Patent Publication No. 2012/0034150 A1, published Feb. 9, 2012, the disclosure of which is hereby incorporated herein in its entirety by this reference, discloses background information hereto.

Additional information is disclosed in the following documents, the disclosure of each of which is hereby incorporated herein in its entirety by this reference:

1. International Application No. PCT/US2013/000072, filed Mar. 15, 2013, for "Methods and Structures for Reducing Carbon Oxides with Non-Ferrous Catalysts;"
2. International Application No. PCT/US2013/000076, filed Mar. 15, 2013, for "Methods and Systems for Thermal Energy Recovery from Production of Solid Carbon Materials by Reducing Carbon Oxides;"
3. International Application No. PCT/US2013/000073, filed Mar. 15, 2013, for "Methods and Reactors for Producing Solid Carbon Nanotubes, Solid Carbon Clusters, and Forests;"
4. International Application No. PCT/US2013/000075, filed Mar. 15, 2013, for "Methods for Treating an Offgas Containing Carbon Oxides;"
5. International Application No. PCT/US2013/000071, filed Mar. 15, 2013, for "Methods for Using Metal Catalysts in Carbon Oxide Catalytic Converters;"
6. International Application No. PCT/US2013/000081, filed Mar. 15, 2013, for "Methods and Systems for Capturing and Sequestering Carbon and for Reducing the Mass of Carbon Oxides in a Waste Gas Stream;"
7. International Application No. PCT/US2013/000078, filed Mar. 15, 2013, for "Methods and Systems for Forming Ammonia and Solid Carbon Products;" and
8. International Application No. PCT/US2013/000079, filed Mar. 15, 2013, for "Carbon Nanotubes Having a Bimodal Size Distribution."

Solid carbon has numerous commercial applications. These applications include longstanding uses such as uses of carbon black and carbon fibers as a filler material in tires, inks, etc., many uses for various forms of graphite (e.g., pyrolytic graphite in heat shields) and innovative and emerging applications for buckminsterfullerene and carbon nanotubes. Conventional methods for the manufacture of various foul's of solid carbon typically involve the pyrolysis of hydrocarbons in the presence of a suitable catalyst. Hydrocarbons are typically used as the carbon sources due to an abundant availability and relatively low cost. The use of carbon oxides as the carbon source in the production of solid carbon has largely been unexploited.

Carbon oxides, particularly carbon dioxide, are abundant gases that may be extracted from point-source emissions such as the exhaust gases of hydrocarbon combustion or from some process off-gases. Carbon dioxide may also be extracted from the air. Because point-source emissions have much higher concentrations of carbon dioxide than does air, they are often economical sources from which to harvest carbon dioxide. However, the immediate availability of air may provide cost offsets by eliminating transportation costs through local manufacturing of solid carbon products from carbon dioxide in air.

Carbon dioxide is increasingly available and inexpensive as a byproduct of power generation and chemical processes in which an object may be to reduce or eliminate the emission of carbon dioxide into the atmosphere by capture and subsequent sequestration of the carbon dioxide (e.g., by injection into a geological formation). For example, the capture and sequestration of carbon dioxide is the basis for some "green" coal-fired power stations. In current practice, capture and sequestration of the carbon dioxide entails significant cost.

There is a spectrum of reactions involving carbon, oxygen, and hydrogen wherein various equilibria have been identified. Hydrocarbon pyrolysis involves equilibria between hydrogen and carbon that favors solid carbon production, typically with little or no oxygen present. The Boudouard reaction, also called the "carbon monoxide disproportionation reaction," is the range of equilibria between carbon and oxygen that favors solid carbon production, typically with little or no hydrogen present. The Bosch reaction is within a region of equilibria where all of carbon, oxygen, and hydrogen are present under reaction conditions that also favor solid carbon production.

The relationship between the hydrocarbon pyrolysis, Boudouard, and Bosch reactions may be understood in terms of a C—H—O equilibrium diagram, as shown in FIG. 1. The C—H—O equilibrium diagram of FIG. 1 shows various known routes to solid carbon, including carbon nanotubes ("CNTs"). The hydrocarbon pyrolysis reactions occur on the equilibrium line that connects H and C and in the region near the left edge of the triangle to the upper left of the dashed lines. Two dashed lines are shown because the transition between the pyrolysis zone and the Bosch reaction zone may change with reactor temperature. The Boudouard, or carbon monoxide disproportionation reactions, occur near the equilibrium line that connects O and C (i.e., the right edge of the triangle). The equilibrium lines for various temperatures that traverse the diagram show the approximate regions in which solid carbon will form. For each temperature, solid carbon may form in the regions above the associated equilibrium line, but will not generally form in the regions below the equilibrium line. The Boudouard reaction zone appears at the right side of the triangle. In this zone, the Boudouard reaction is thermodynamically preferred over the Bosch reaction. In the region between the pyrolysis zone and the Boudouard reaction zone and above a particular reaction temperature curve, the Bosch reaction is thermodynamically preferred over the Boudouard reaction.

CNTs are valuable because of their unique material properties, including strength, current-carrying capacity, and thermal and electrical conductivity. Current bulk use of CNTs includes use as an additive to resins in the manufacture of composites. Research and development on the applications of CNTs is very active with a wide variety of applications in use or under consideration. One obstacle to widespread use of CNTs has been the cost of manufacture.

U.S. Pat. No. 7,794,690 (Abatzoglou et al.) teaches a dry reforming process for sequestration of carbon from an organic material. Abatzoglou discloses a process utilizing a 2D carbon sequestration catalyst with, optionally, a 3D dry reforming catalyst. For example, Abatzoglou discloses a two-stage process for dry reformation of an organic material (e.g., methane, ethanol) and $CO_2$ over a 3D catalyst to form syngas, in a first stage, followed by carbon sequestration of syngas over a 2D carbon steel catalyst to form CNTs and carbon nanofilaments. The 2D catalyst may be an active metal (e.g., Ni, Rh, Ru, Cu—Ni, Sn—Ni) on a nonporous metallic or ceramic support, or an iron-based catalyst (e.g., steel), on a monolith support. The 3D catalyst may be of similar composition, or may be a composite catalyst (e.g., $Ni/ZrO_2$—$Al_2O_3$) over a similar support. Abatzoglou teaches preactivation of a 2D catalyst by passing an inert gas stream over a surface of the catalyst at a temperature beyond its eutectic point, to transform the iron into its alpha phase. Abatzoglou teaches minimizing water in the two-stage process or introducing water in low concentrations (0 to 10 wt %) in a reactant gas mixture during the dry reformation first stage.

BRIEF SUMMARY

In some embodiments, a two-stage reaction process includes reacting a first feed mixture having a carbon source with a reducing agent under first reaction conditions to convert at least a portion of the first feed mixture to a first product mixture comprising carbon monoxide and water. At least a portion of the water is condensed from the first product mixture to form a first dried product mixture. The first dried product mixture reacts under second reaction conditions to convert at least a portion of the carbon monoxide in the first dried product mixture to solid carbon and a second product mixture including water.

In some embodiments, a method for two-stage reduction of carbon dioxide includes reacting a feed gas mixture having carbon dioxide and a reducing gas to form a reaction mixture having carbon monoxide and water. A portion of the water is condensed from the reaction mixture to form a dried reaction mixture. The dried reaction mixture is mixed with a recirculating gas to form a catalytic converter feed gas mixture. The catalytic converter feed gas mixture flows through a catalytic converter in the presence of a metal to form solid carbon and a catalytic converter tail gas mixture including water. The catalytic converter tail gas mixture flows through a heat exchanger to condense a portion of the water and form the recirculating gas.

In certain embodiments hereof, the partial pressure of water in the reaction is regulated by various means, including recycling and condensation of water, to influence, for example, the structure or other aspects of the composition of carbon products produced. The partial pressure of water appears to assist in obtaining certain desirable carbon allotropes.

In certain embodiments, a broad range of inexpensive and readily-available catalysts, including steel-based catalysts, are described, without the need for activation of the catalyst before it is used in a reaction. Iron alloys, including steel, may contain various allotropes of iron, including alpha-iron (austenite), gamma iron, and delta-iron. In some embodiments, reactions disclosed herein advantageously utilize an iron-based catalyst, wherein the iron is not in an alpha phase. In certain embodiments, a stainless steel containing iron primarily in the austenitic phase is used as a catalyst.

Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

In certain embodiments, a two-stage reaction process for converting carbon dioxide to a solid carbon product includes reacting a first feed mixture having gaseous carbon dioxide and hydrogen under first reaction conditions to convert at least a portion of the carbon dioxide and hydrogen to carbon monoxide and water and form a first product mixture. At least a portion of the water is condensed from the first product mixture to form a dried first product mixture. The dried first product mixture is mixed with a recirculatory stream of a dried second product mixture to form a second feed mixture including carbon monoxide. The second feed mixture reacts under second reaction conditions to convert at least a portion of the carbon monoxide in the second feed mixture to solid carbon and a second gaseous product including water and unreacted gases from the second feed mixture. At least a portion of the water from the second gaseous reaction product is condensed to form the dried second product mixture.

BRIEF DESCRIPTION OF THE DRAWINGS

Features and advantages of the disclosure will be apparent from reference to the following detailed description taken in conjunction with the accompanying drawings, in which.

DETAILED DESCRIPTION

The disclosure includes methods for reacting a carbon source with a reducing agent. The methods may be used to manufacture solid carbon products in various morphologies, and to convert carbon oxides into solid carbon and water. Solid carbon products may include graphite (e.g., pyrolytic graphite), graphene, carbon black, fibrous carbon, buckminsterfullerenes, single-wall CNTs, or multi-wall CNTs. The type, purity, and homogeneity of solid carbon products may be controlled by the reaction conditions (time, temperature, pressure, partial pressure of reactants, and/or catalyst properties).

The methods use the Bosch reaction to produce solid carbon products by the reduction of carbon dioxide with any of a variety of reducing gases such as hydrogen or methane in the presence of a catalyst and under reaction conditions optimized for any particular desired type of solid carbon. This catalytic conversion process may be incorporated with a variety of separation technologies, and with a variety of carbon dioxide generation processes.

Figure 1:
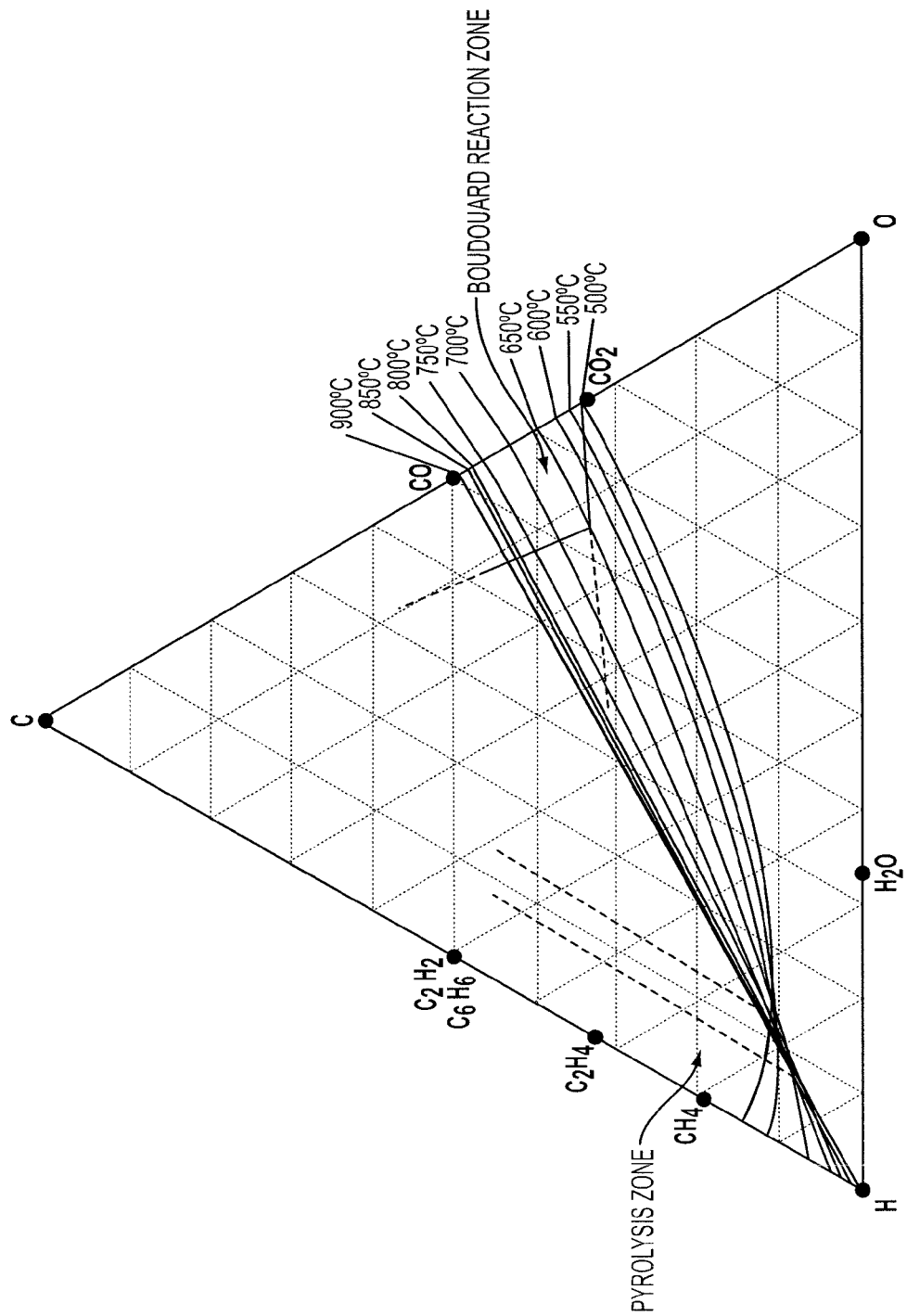
FIG. 1 depicts a C—H—O equilibrium diagram.

The methods, based generally on the Bosch reaction, include reactions in the interior region of the phase diagram shown in FIG. 1 (i.e., the region between the Boudouard reaction zone and the pyrolysis zone), where equilibrium may be established between solid carbon, compounds of carbon, hydrogen and oxygen. The central region of FIG. 1 has several points that are favorable for the formation of CNTs and other forms of solid carbon. The type of solid carbon produced can be selectively controlled through selection and processing of catalysts, reaction gases, and reaction conditions. Thus these methods open new routes to the production of valuable solid carbon products such as CNTs.

The process uses two abundant feedstocks, carbon oxides (e.g., carbon dioxide, carbon monoxide) and a reducing agent. The reducing agent is preferably a hydrocarbon gas (e.g., natural gas, methane, ethane, ethylene, etc.), an alcohol (e.g., methanol, ethanol, etc.) hydrogen ($H_2$) gas, or a mixture thereof. A hydrocarbon gas may serve a dual function as both an additional carbon source and as the reducing agent for the carbon oxides. "Syngas" comprises primarily carbon monoxide and hydrogen, and syngas has both the carbon oxide and the reducing gas in a mixture. Syngas may be used as all or a portion of the reaction gas mixture.

The reduction process of this method results in the formation of solid carbon product and water. The water may subsequently be condensed and the latent heat extracted for heating purposes, or as part of a low-pressure power extraction cycle. The water may be extracted as a useful co-product, and the associated latent heat of the water may be used for another process.

The methods disclosed herein use the carbon dioxide as an economically valuable feed stock. In many industrial processes, carbon dioxide is an undesirable waste product, and may have associated disposal costs. Use of carbon dioxide as a feed in solid carbon production may reduce or eliminate disposal costs, and may simultaneously convert carbon dioxide to a salable product. Thus, the methods may be incorporated with fossil fuel combustion processes. Combining the processes disclosed herein with fossil fuel combustion processes may also be beneficial because formation of solid carbon products by such processes may be more economical than existing separation and sequestration methods.

Carbon dioxide is present in many natural gas deposits at various concentrations, such as at concentrations of up to 5% by volume, up to 20% by volume, up to 60% by volume, or even higher. Other compounds, such as $H_2S$, $SO_2$, and other sulfur compounds are often present in natural gas. Removal of sulfur-containing compounds is often done at a well site to form "sweet gas" (i.e., gas with little or no sulfur content). Removal of carbon dioxide before the natural gas is delivered to a consumer may be effectively accomplished via the techniques disclosed herein.

The methods disclosed produce solid carbon products such as buckminsterfullerene and carbon nanotubes using carbon oxides as the primary carbon source. The methods thus involve catalytic conversion of carbon oxides to solid carbon and water. The methods may use carbon oxides from various sources, such as the atmosphere, combustion gases, process off-gases, well gas, and other natural and industrial sources of carbon oxides. The carbon oxides may be separated from these sources and concentrated as needed, such as by amine absorption and regeneration.

The Bosch reactions, as described herein, use a reducing agent (e.g., hydrogen, a hydrocarbon, etc.) to reduce carbon oxides to solid carbon (e.g., graphite, graphene, carbon black, fibrous carbon, buckminsterfullerene, single-wall CNTs, multi-wall CNTs, carbon platelets, nanodiamond, etc.) and water. The reactions may be conducted at temperatures in excess of approximately 650° C., such as in excess of about 680° C., in the presence of a catalyst. In the formation of CNTs, graphite, or $C_{60}$ fullerene, the Bosch reaction of carbon dioxide with hydrogen is mildly exothermic (heat producing) and proceeds with the stoichiometry:

$$CO_2 + 2H_2 \leftrightarrow C_{(s)} + 2H_2O \quad \text{(Equation 1)}.$$

The formation of CNTs in Equation 1 releases approximately 24.9 kcal/mol at 650° C. (i.e., $\Delta H = -24.9$ kcal/mol). The formation of graphite in Equation 1 releases approximately 23.8 kcal/mol at 650° C. The formation of $C_{60}$ fullerene in Equation 1 releases approximately 13.6 kcal/mol at 650° C. The formation of carbon lamp black in Equation 1 is endothermic, consuming approximately 147.5 kcal/mol at 650° C. (i.e., $\Delta H$ is +147.5 kcal/mol). The Bosch reactions are reversible; in the reverse of Equation 1, solid carbon is oxidized by water to form carbon dioxide and hydrogen in an oxygen shift reaction.

The Bosch reactions are actually two-step reactions having an overall release of energy (i.e., the net reactions are exothermic). In the first step of the reaction shown in Equation 1, carbon dioxide reacts with hydrogen to create carbon monoxide and water in a reverse water-gas shift reaction:

$$CO_2 + H_2 \leftrightarrow CO + H_2O \quad \text{(Equation 2)}.$$

Equation 2 is slightly endothermic at 650° C., requiring a heat input of about 8.47 kcal/mol (i.e., $\Delta H = +8.47$ kcal/mol). In the second step of the reaction shown in Equation 1, carbon monoxide reacts with hydrogen to form solid carbon and water:

$$CO + H_2 \leftrightarrow C_{(s)} + H_2O \quad \text{(Equation 3)}.$$

Equation 3 may occur with stoichiometric amounts of reactants, or with excess $CO_2$ or $H_2$. Equation 3 is exothermic at 650° C., releasing 33.4 kcal/mol ($1.16 \times 10^4$ joules/gram of $C_{(s)}$) when CNTs are formed (i.e., $\Delta H = -33.4$ kcal/mol). Values of $\Delta H$ for Equation 3 may be calculated for other carbon products by the difference between the $\Delta H$ value for Equation 1 for that particular carbon product and the $\Delta H$ value for Equation 2.

The method involves the creation of solid carbon, and in particular, CNTs of different shapes or morphologies, from carbon oxides. The carbon oxides may be a product of combustion of a primary hydrocarbon, from the atmosphere, or from some other source. The carbon oxides and a reducing agent may be injected into a reaction zone that has been preheated to a reaction temperature. The reaction typically occurs in the presence of a catalyst. The catalyst composition and grain size may affect the morphology of the resulting solid carbon products. The reaction conditions, including the temperature and pressure of the reactor, the residence time of the reaction gases, and the grain size of the catalyst, may be controlled to obtain solid carbon products having selected characteristics. Feed and product mixtures may pass through one or more condensers to remove excess water and to control the partial pressure of water vapor in the reaction gas mixture. The partial pressure of water is one factor that appears to affect the type and character (e.g., morphology) of solid carbon formed, as well as the kinetics of carbon formation.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs, lower carbon activity tends to result in the formation of graphitic forms.

Carbon activity for a reaction forming solid carbon from gaseous reactants can be defined as the reaction equilibrium constant times the partial pressure of gaseous products, divided by the partial pressure of reactants. For example, in the reaction, $CO_{(g)} + H_{2(g)} \rightleftharpoons C_{(s)} + H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T (Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reaction gases in the reactor.

Solid carbon may be produced in many different morphologies through the carbon oxide reduction process of the method. Some of the solid carbon morphologies that may be produced include graphite (e.g., pyrolytic graphite), graphene, carbon black, fibrous carbon, buckminsterfullerene, single-wall CNTs, multi-wall CNTs, platelets, or nanodiamond.

Reducing agents suitable for the reduction reaction may include hydrogen or hydrocarbon gases. Hydrocarbon gases may provide both hydrogen and a portion of the carbon. A reducing gas mixture of one or more of the commonly available hydrocarbon gases such as lower hydrocarbon alkanes (e.g., methane, ethane, propane, butane, pentane, and hexane), including those found in natural gas, may be economical in some applications. In one embodiment, the reducing gas comprises methane and releases heat in an exothermic reaction:

$$CO_2 + CH_4 \leftrightarrow 2C_{(s)} + 2H_2O \qquad \text{(Equation 4)}.$$

The reaction kinetics favorable to the formation of the desired species of solid carbon may be established through the use of suitable catalysts. For example, metals from groups 2 through 15 of the periodic table, such as from groups 5 through 10 (e.g., nickel, molybdenum, chromium, cobalt, tungsten, vanadium, ruthenium, platinum, iridium, iron, etc.) actinides, lanthanides, or compounds containing any such metals (e.g., iron carbide) may accelerate the reaction rates of any of Equations 1 through 4. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. In some embodiments, commercially available metals are used without special preparation. Catalysts may facilitate operations at lower temperatures. In reactions forming CNTs, higher reaction rates may correspond to smaller diameter CNTs, and lower reaction rates may correspond to larger diameter CNTs.

Catalysts may be in the form of nanoparticles or in the form of domains or grains and grain boundaries within a solid material. Catalysts may be selected to have a grain size related to a characteristic dimension of a desired diameter of the solid carbon product (e.g., a CNT diameter). Catalyst powder may be formed in or near the reaction zone by injecting an aerosol solution such that upon evaporation or a carrier solvent, a selected particle size distribution results. Alternatively, powdered catalyst may be entrained in a carrier gas and delivered to the reactor. By selecting the catalyst and the reaction conditions, the process may be tuned to produce selected morphologies of solid carbon product. In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor).

Catalysts can be formed from a wide variety of catalyst precursors. Such catalyst precursors may decompose to form a desired catalyst. The catalyst precursors may be selected such that their decomposition temperature is below the temperature of a reaction zone, so that when the catalyst precursors are introduced into the reaction zone, they decompose to form catalyst particles. The size of the catalyst particles may be controlled by the use of catalyst precursors. That is, by forming catalyst particles in situ, the catalyst particles may be kept to a smaller and/or more uniform size than is possible by other means. The morphology and diameter of the CNTs may be controlled by controlling the properties of the catalyst particles.

Catalyst precursors may be mixed and dissolved in water or another solvent to make a solution of the catalyst precursors. The resulting solution may be dried to form the catalyst. In some embodiments, the solution may be sprayed to form an aerosol in a heated chamber, such as by atomization in a flow of gas, direct spraying of the solution through a nozzle, electrostatic spraying, dispersing the solution from the surface of a rotating fixture, and combinations thereof. In some embodiments, catalyst precursors may be combusted by disposing a solution of catalyst precursor on a heated surface, allowing the solvent to evaporate, then allowing the catalyst precursor to combust. Other methods include creating the catalyst by a vacuum-deposition process at high vacuum (e.g., $10^{-6}$ to $10^{-8}$ Torr) and high temperatures (e.g., 900° C. to 1300° C.). Catalysts may be supplied as metal nanoparticles supported on solid supports via secondary dispersion and extraction. Suitable catalysts are described in, for example, U.S. Patent Application Publication No. 2012/0034150 A1. The catalyst may be mobilized, as in a fluidized bed, or may be stationary in the reactor as the carbon-containing gases flow through the reactor and react with the catalyst.

The catalyst particles may be nucleating sites from which CNTs grow. The catalyst particles may be domains or grains in a piece of metal material or discrete nanoparticles of catalytic metal deposited on an inert substrate (e.g., a quartz disk). The size of CNTs may be proportional to the size of the nucleating site. The ratio between a catalyst particle size and the diameter of a CNT formed thereon may be from about 1.2 to about 1.6. One possible theoretical basis for the correlation of particle size and CNT diameter is disclosed in Nasibulin et al., *Correlation Between Catalyst Particle and Single-walled Carbon Nanotube Diameters*, 43 Carbon 2251-57 (2005).

The catalyst may be any metal suitable for the progression of a carbon-forming reaction. Various commercially available grades of nickel, molybdenum, platinum, chromium, cobalt, and tungsten, and alloys thereof may be useful as catalysts. Various grades of chromium-, molybdenum-, cobalt-, tungsten-, or nickel-containing alloys or superalloys may be used, for example materials commercially available from Special Metals Corp., of New Hartford, N.Y., under the trade name INCONEL®, or materials commercially available from Haynes International, Inc., of Kokomo, Ind., under the trade name HASTELLOY® (e.g., HASTELLOY® B-2, HASTELLOY® B-3, HASTELLOY® C-4, HASTELLOY® C-2000, HASTELLOY® C-22, HASTELLOY® C-276, HASTELLOY® G-30, HASTELLOY® N, or HASTELLOY® W). The catalyst may be in solid form, such as plates, cylinders, pellets, spheres of various diameters (e.g., as steel shot), or combinations thereof.

304 stainless steel appears to catalyze the formation of CNTs under a wide range of temperatures, pressures, and gas compositions. However, the rate of formation of CNTs on 304 stainless steel appears to be relatively low, such that 304 stainless steel may be used effectively as a construction material for process equipment, with minimal deposition on surfaces thereof in normal operations. 316L stainless steel, in contrast, appears to catalyze the formation of solid carbon at significantly higher rates than 304 stainless steel, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the good results observed with 316L stainless steel, the Ni and/or Cr may have a synergistic effect with Fe.

In one embodiment, substantially spherical catalyst material may be used in conjunction with a fluidized-bed reactor. The morphology of CNTs grown on metal catalyst may be dependent on the chemistry of the metal catalyst and the way the catalyst was processed. For example, CNT morphology may be related to grain size and grain boundary shapes within the metal. For example, the characteristic size of these features may influence the characteristic diameter of CNTs formed in the presence of such metal catalysts.

The grain size of a catalyst material may at least partially determine the size of the CNT product. Metals with smaller grain sizes may produce smaller diameter CNTs. The grain size may be a function both of the chemistry of the metal catalyst and the heat-treating methods under which the grains are formed.

The grain size of the metal crystalline surface may also at least partially determine the size of the CNT product. The grain distribution, including the crystalline grain size and grain boundaries, may be controlled by methods known in the art. For example, grain size may be controlled by controlling nucleation of the metal, such as by grain refinement or inoculation. Inoculants for promoting nucleation may include titanium, boron, aluminum titanium ($Al_3Ti$), titanium diboride ($TiB_2$), etc.

In general, the grain structure of a metal surface may be changed by methods known in the art. For example, a metal structure may be heated to a temperature sufficient to recrystallize the metal structure to form multiple randomly oriented grains. Alternatively, the metal may be heat-treated or annealed to change the grain structure, grain boundary, and grain size. For example, the metal may be annealed by heating the metal to a temperature above its recrystallization temperature, maintaining the temperature for a period of time, then cooling the metal. As another example, metal may be annealed by heating it for a period of time to allow grains within the microstructure of the metal to form new grains through recrystallization.

Recrystallization is a process in which a metal may be plastically deformed, annealed, or otherwise heat-treated. When the metal is heated, the heat-treatment affects grain growth in the metal structure. The size of a crystalline structure may vary with the temperature above the critical temperature and the time at that temperature. Additionally, a faster cooling rate from the recrystallization temperature may provide a larger maximum undercooling and a greater number of nucleation sites, thus producing a finer-grained metal. Thus, in one embodiment, crystal grain size—and thus, nanotube size—may be controlled by nucleation of the catalyst metal, the temperature of the catalyst heat-treatment, the length of time the catalyst metal is above the crystallization temperature, and the cooling process of the metal.

Nucleation of a catalyst may be promoted by the use of pulsed laser light, such as by passing electromagnetic pulses through the catalyst or through catalyst precursors. This use of laser light may enhance the size uniformity of the resulting catalyst nanoparticles.

Oxidation and subsequent reduction of the catalyst surface alter the grain structure and grain boundaries. Without being bound by any particular theory, oxidation appears to alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 µm to about 500 µm, from about 0.2 µm to about 100 µm, from about 0.5 µm to about 10 µm, or from about 1.0 µm to about 2.0 µm. In some embodiments, the catalyst may be an oxidized metal (e.g., rusted steel) that is reduced before or during a reaction forming solid carbon. Without being bound to any particular theory, it is believed that removal of oxides leaves voids or irregularities in the surface of the catalyst material, and increases the overall surface area of the catalyst material.

In some embodiments, the catalyst may be pulverized or ball-milled. Powder from the pulverization or ball-milling process may be collected and sieved to increase the uniformity of the catalyst particle size. If the catalyst is in powder or particulate form, the catalyst may be carried into the reactor by a carrier gas or a reactant gas. Catalyst in particulate form may also be used in a fluidized-bed reactor. Dynamic action of metal catalyst particles within the fluidized bed may continually cause fresh catalyst surfaces to be exposed as carbon nanotubes are formed and spalled off of the catalyst particle surface. Catalyst particles may be configured to increase the surface area of the catalyst in contact with the carbon oxide gases and the reducing gases as the reaction proceeds.

Reaction temperatures may depend on the composition of the catalyst or on the size of the catalyst particles. Catalyst materials having small particle sizes tend to catalyze reactions at lower temperatures than the same catalyst materials with larger particle sizes. For example, the Bosch reaction may occur at temperatures in the range of approximately 400° C. to 800° C. for iron-based catalysts, depending on the particle size and composition and the desired solid carbon product. In general, graphite and amorphous solid carbon form at lower temperatures, and CNTs form at higher temperatures. CNTs may form at temperatures above about 680° C. In general, the reactions described herein proceed at a wide range of pressures, from near vacuum, to pressures of 4.0 MPa (580 psi) or higher. For example, CNTs may form in pressure ranges of from about 0.28 MPa (40 psi) to about 6.2 MPa (900 psi). In some embodiments, CNTs may form at pressures from about 0.34 MPa (50 psi) to about 0.41 MPa (60 psi), or at a pressure of about 4.1 MPa (600 psi). Typically, increasing the pressure increases the reaction rate.

When using a solid bulk catalyst, such as a wafer of metal catalyst, CNTs may appear to grow in a series of generations. For example, CNTs may form clumps, pillows, forests, fibers, piles, etc., as described in U.S. Patent Application Publication No. 2012/0034150 A1.

A wide variety of reactor designs may be used to facilitate the formation and collection of the desired solid carbon products. Aerosol and fluidized-bed reactors are well-suited for high-volume continuous production of solid carbon products. A fluid-wall reactor has the advantages of providing for the introduction of various substances (catalysts, additional reactants) and of minimizing or eliminating the accumulation of solid carbon products on reactor walls.

In some embodiments, the reactor may be an aerosol reactor in which the catalyst is formed in a gas phase or in which the catalyst is preformed and selected for a specific size distribution, mixed into a liquid or carrier gas solution, and then sprayed into the reactor (e.g., via electrospray). The catalyst may then remain distributed in the gas phase or be deposited on solid surfaces in the reaction zone for the growth phase of the carbon product. The catalyst may subsequently transport the product out of the reaction zone. In another embodiment, one or more reactors may be fluidized-bed reactors in which the catalyst or catalyst-coated particles are introduced into the reactor and the solid carbon product is grown on the surface of the particles. The solid carbon may be either elutriated in the reactor, and carried out of the reactor entrained in the reaction gases, or the catalyst particles may be harvested and the solid carbon removed from the surface.

The reactors may be batch reactors in which the catalyst is either a fixed solid surface or is mounted on a fixed solid surface (e.g., catalyst nanoparticles deposited on an inert substrate), with the solid carbon grown on the catalyst, and the catalyst and solid carbon product periodically removed from the reactor. Alternatively, the reactors may be continuous, wherein a solid catalyst or catalyst mounted on a solid substrate passes through a flowing gas stream, the resulting solid carbon product is harvested, and the solid surface is reintroduced to the reactor. The solid substrate may be the catalyst material (e.g., a solid piece of a chromium-, molybdenum-, cobalt-, or nickel-containing alloy or superalloy) or a surface on which the catalyst is mounted.

In one embodiment, a fluidized-bed reactor may be designed to retain the catalyst while allowing the solid CNT product to be entrained in the gas flow and to be lofted out of the reaction zone upon reaching a desired size. The shape of the reactor, the gas flow rates, or shape and flow rates in combination may control the residence time of the elutriates and the corresponding size of the solid carbon product (such as the length of the carbon nanotubes).

In one embodiment, particles in a fluidized-bed reactor are of a substantially uniform diameter. The diameter of the catalyst in the fluidized bed may be chosen based on the particular reactor configuration, the flow rate of the reactants through the reactor, the shape of the catalyst, the density of the catalyst, and the density of the reactant gases and any inert carrier gases. The diameter of the catalyst particles may be chosen to avoid entrainment of the catalyst with the reaction product and also to avoid channeling of the reactants through the bed. A diffuser or sparger may distribute the gaseous reactants to provide a uniform flow pattern through the bed particles and limit or prevent channeling of gases through the particle bed.

When the catalyst is a sheet or plate over an object of manufacture, the entire surface of the object of manufacture need not be uniformly coated with the carbon product. The carbon deposition area on the solid surface optionally may be limited to one or more regions by masking, or by selectively depositing the catalyst to promote the formation of the solid carbon on portions of the solid surface.

Solid carbon products may be collected and separated from the gas stream or from solid surfaces on which they form, such as by elutriation, centrifugation, electrostatic precipitation, or filtration. The techniques for separation of the solid product from the gas stream and the catalyst may depend on the type of reactor. For example, the solid carbon product may be harvested directly from a gas stream using electrophoretic or thermophoretic collectors, filters, etc., or by collecting the elutriates as they exit the reactor.

In one embodiment, a cyclone separator is used to separate and collect the solid carbon product. For a solid catalyst or solid-surface-mounted catalyst, the solid carbon product may be scraped or otherwise abraded from the surface of the solid carrier material. Alternatively, when using a solid catalyst, the solid carbon product may be rinsed off a surface with a solvent for further processing.

In some cases, it may be beneficial to remove the solid carbon product from the reaction gas mixture prior to cooling (e.g., by withdrawing the solid carbon product from the reactor through a purge chamber wherein the reaction gases are displaced by an inert purging gas such as argon, nitrogen, or helium). Purging prior to cooling helps reduce the deposit or growth of undesirable morphologies on the desired solid carbon product during the cooling process.

In aerosol or fluidized-bed reactors, the residence time in the growth zone may be controlled by one or more forces (such as gravitational, electromagnetic, or centrifugal forces) counteracting the motion of the gas stream. These forces counterbalance the gas flow to help control the residence time, so that the size of the solid carbon product may be controlled.

In another embodiment, catalysts are introduced into an aerosol reactor by an electrospray process. Coulomb forces separate a suspension or solution containing a catalyst powder into small droplets from which individual particles form. The electrospray helps keep the particles separated so that they do not tend to clump or fuse. The electrospray also tends to charge the resulting carbon particles and make them easier to harvest from the aerosol using electrostatic collectors.

In aerosol reactors, catalyst particles may be sprayed into a carrier gas or fluid for transport into the reaction zone. The catalyst may be preconditioned in a catalyst-conditioning process prior to mixing with the reaction gases. Catalyst conditioning by heating in an inert carrier gas may promote the growth of specific chiralities of single wall CNTs. For example, heating catalyst material in a helium environment may promote the growth of chiralities of CNTs having metallic properties. One or more substances may be introduced into the reaction zone to modify the physical properties of the desired solid carbon product, either through incorporation in the solid carbon product, or by surface deposition on the solid carbon product.

The physical properties of the solid carbon products may be substantially modified by the application of additional substances to the surface of the solid carbon. Modifying agents (e.g., ammonia, thiophene, nitrogen gas, and/or surplus hydrogen) may be added to the reaction gases to modify the physical properties of the resulting solid carbon. Modifications and functionalizations may be performed in the reaction zone or after the solid carbon products have been removed.

Some modifying agents may be introduced into the reduction reaction chamber near the completion of the solid carbon formation reaction by, for example, injecting a water stream containing a substance to be deposited, such as a metal ion. The substances may also be introduced as a component of a carrier gas. For example, surplus hydrogen may cause hydrogenation of a carbon lattice in some CNTs, causing the CNTs to have semiconductor properties.

Small amounts of substances (e.g., sulfur) added to the reaction zone may be catalyst promoters that accelerate the growth of carbon products on the catalysts. Such promoters may be introduced into the reactor in a wide variety of compounds. Such compounds may be selected such that the decomposition temperature of the compound is below the reaction temperature. For example, if sulfur is selected as a promoter for an iron-based catalyst, the sulfur may be introduced into the reaction zone as a thiophene gas, or as thiophene droplets in a carrier gas. Examples of sulfur-containing promoters include thiophene, hydrogen sulfide, heterocyclic sulfide, and inorganic sulfide. Other promoters include lead compounds and bismuth.

In some embodiments, a catalyst particle is removed from the surrounding matrix as a CNT grows, and the catalyst particle may become embedded in one of the ends of the CNT. Thus, some of the catalyst material may be physically removed during the reaction, and the catalyst may need to be continually replenished. The material on which a CNT grows may not be considered a catalyst in the classical sense, but is nonetheless referred to herein and in the art as a "catalyst," because the carbon is not believed to react with the material. Furthermore, CNTs may not form at all absent the catalyst. In scanning electron microscope images, catalyst ends appear significantly larger (e.g., 1.2 to 1.6 times the diameter) than the tubes that grow from them. This difference may be due to a carbon shell surrounding the catalyst, it may be indicative of a fundamental relationship between the catalyst particle size and that of the CNT that grows from it, or it may be due to some other factor or coincidence. Whatever the reason, one way to control the size of the CNTs appears to be through the control of the catalyst particle size, or grain size, keeping the catalyst particle size somewhat larger than the desired nanotube size.

Figure 2:
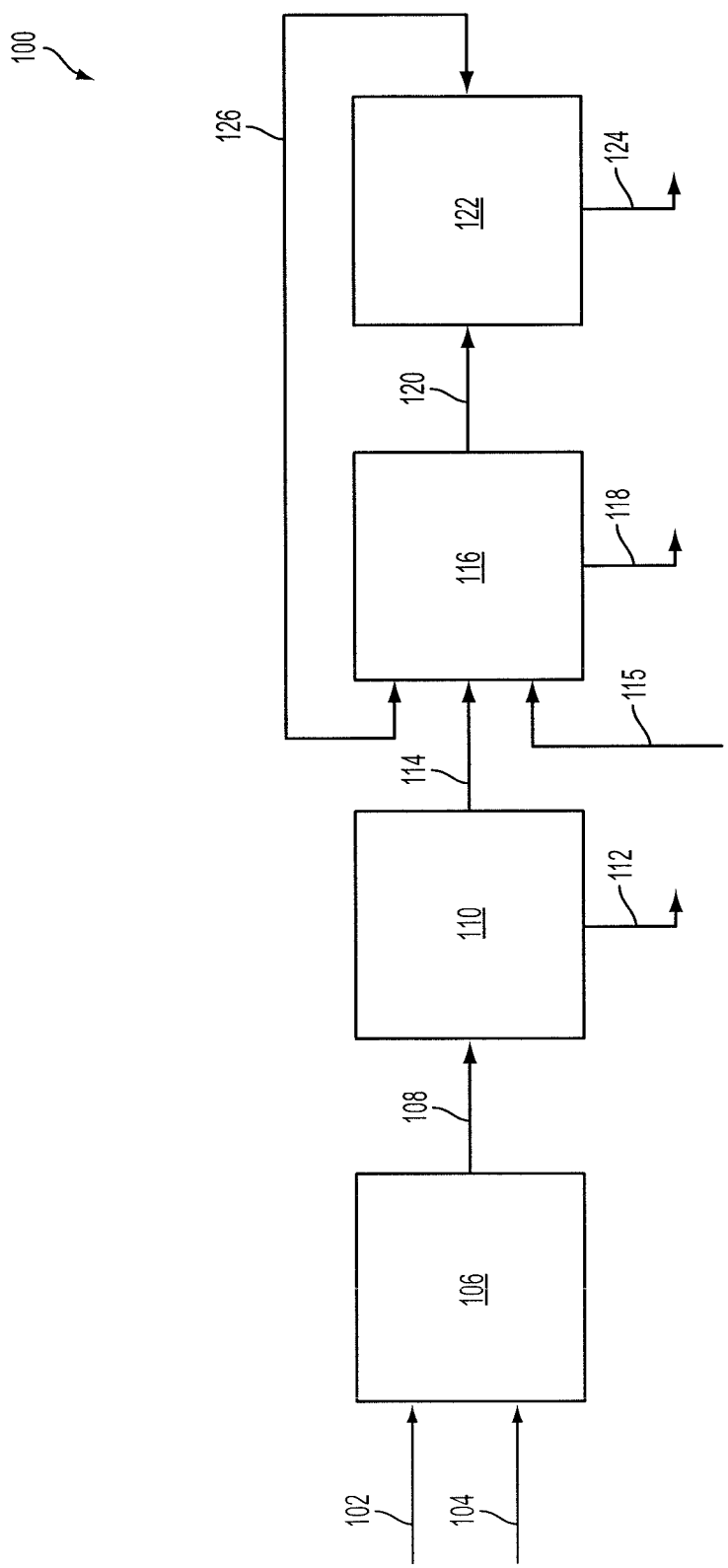
FIGS. 2 through 4 each illustrate simplified process-flow diagrams indicating how processes of the current disclosure may be performed.

A process for converting a carbon source to a solid carbon product may be advantageously performed in two or more stages. For example, FIG. 2 shows a system 100 that may be used in such a method. A carbon source 102 and a reducing agent 104 enter a first reactor 106. The carbon source 102 may include a feed mixture comprising gaseous $CO_2$, CO, and/or another carbon-containing compound. The reducing agent 104 may include $H_2$, a hydrocarbon such as $CH_4$, or any mixture thereof. The carbon source 102 and the reducing agent 104 may be combined before entering the first reactor 106 or may be mixed within the first reactor 106. In some embodiments, a single source material (e.g., syngas, a mixture of CO and $H_2$) may serve as both the carbon source 102 and the reducing agent 104.

The first reactor 106 may be any vessel configured to contain, mix, and/or react the carbon source 102 and the reducing agent 104. For example, the first reactor 106 may be a fluidized bed. The first reactor 106 may be adapted to provide conditions in which the carbon source 102 and the reducing agent 104 react to form a first reaction product mixture 108. For example, the first reactor 106 may include appropriate means for material handling, mixing, controlling temperature, controlling pressure, etc. The first reactor 106 may include one or more sensors, controllers, etc., and the conditions within the first reactor 106 may remain constant or may vary during processing. For example, controllers may be configured to maintain selected conditions, as indicated by signals received from the one or more sensors.

The first reaction product mixture 108 may include products of the reaction of the carbon source 102 and the reducing agent 104, and one or more of the reactants, such as CO, $H_2O$, $CO_2$, etc. In some embodiments, the carbon source 102 and the reducing agent 104 may react substantially to completion in the first reactor 106, consuming one or both of the carbon source 102 and the reducing agent 104. For example, the carbon source 102 may be provided in excess, and the reducing agent 104 may be substantially or entirely consumed stoichiometrically in the first reactor 106. In such embodiments, the first reaction product mixture 108 may include products (e.g., CO and $H_2O$) and a portion of the carbon source 102; the first reaction product mixture 108 leaving the first reactor 106 may be substantially free of the reducing agent 104.

The first reaction product mixture 108 may enter a first separator 110. The first separator 110 may be, for example, a condenser configured to separate a condensate 112 from a dry first reaction product mixture 114. The condensate 112 may include water or other condensable matter formed in the first reactor 106 or otherwise present in the first reaction product mixture 108. The dry first reaction product mixture 114 may include gases that do not condense at operating conditions of the first separator 110. For example, the dry first reaction product mixture 114 may include CO formed in the first reactor 106 and unreacted $CO_2$ remaining from the carbon source 102.

The dry first reaction product mixture 114 may enter a second reactor 116 with one or more of a second reducing agent 115 and a recirculated mixture 126. The second reducing agent 115 may include $H_2$, a hydrocarbon such as $CH_4$, or any mixture thereof. In some embodiments, the second reducing agent 115 may have the same composition as the reducing agent 104 introduced into the first reactor 106.

The second reactor 116 may be any vessel configured to contain, mix, and/or react the dry first reaction product mixture 114, the second reducing agent 115, and/or the recirculated mixture 126. For example, the second reactor 116 may be a fluidized bed. The second reactor 116 may be adapted to provide conditions in which the dry first reaction product mixture 114, the second reducing agent 115, and/or the recirculated mixture 126 may react to form solids 118 and a second reaction product mixture 120. For example, the second reactor 116 may include appropriate means for material handling, mixing, controlling temperature, controlling pressure, etc. The second reactor 116 may include one or more sensors, controllers, etc., and the conditions within the second reactor 116 may remain constant or may vary during processing. For example, controllers may be configured to maintain selected conditions, as indicated by signals received from the one or more sensors.

The solids 118 formed in the second reactor 116 may include one or more forms of solid carbon. For example, solids 118 may include graphite (e.g., pyrolytic graphite), graphene, carbon black, fibrous carbon, buckminsterfullerenes, single-wall CNTs, multi-wall CNTs, platelets, or nanodiamond. The type of solid carbon product formed may depend on various parameters of the reaction conditions, such as temperatures, pressures, flow rates, reactant compositions, etc. The solids 118 may be separated from the second reaction product mixture 120 within the second reactor 116 or in another device, by any appropriate separation methods.

The second reaction product mixture 120 may include products of the reaction of the dry first reaction product mixture 114, the second reducing agent 115, or the recirculated mixture 126, and one or more of the reactants, such as CO, $H_2O$, $CO_2$, $H_2$, etc. In some embodiments, the dry first reaction product mixture 114 and the second reducing agent 115 may react substantially to completion in the second reactor 116, consuming one or both of the dry first reaction product mixture 114 and the second reducing agent 115. For example, the dry first reaction product mixture 114 may be provided in excess, and the second reducing agent 115 may be substantially or entirely consumed stoichiometrically in the second reactor 116. In such embodiments, the second reaction product mixture 120 may include products (e.g., $H_2O$) and a portion of the dry first reaction product mixture 114; the second reaction product mixture 120 leaving the second reactor 116 may be substantially free of the second reducing agent 115.

The second reaction product mixture 120 may enter a second separator 122. The second separator 122 may be, for example, a condenser configured to separate a condensate 124 from the recirculated mixture 126. The condensate 124 may include water or other condensable matter formed in the second reactor 116 or otherwise present in the second reaction product mixture 120. The recirculated mixture 126 may include gases that do not condense at operating conditions of the second separator 122. For example, the recirculated mixture 126 may include CO and/or $CO_2$ that has not reacted to form solids 118.

Figure 3:
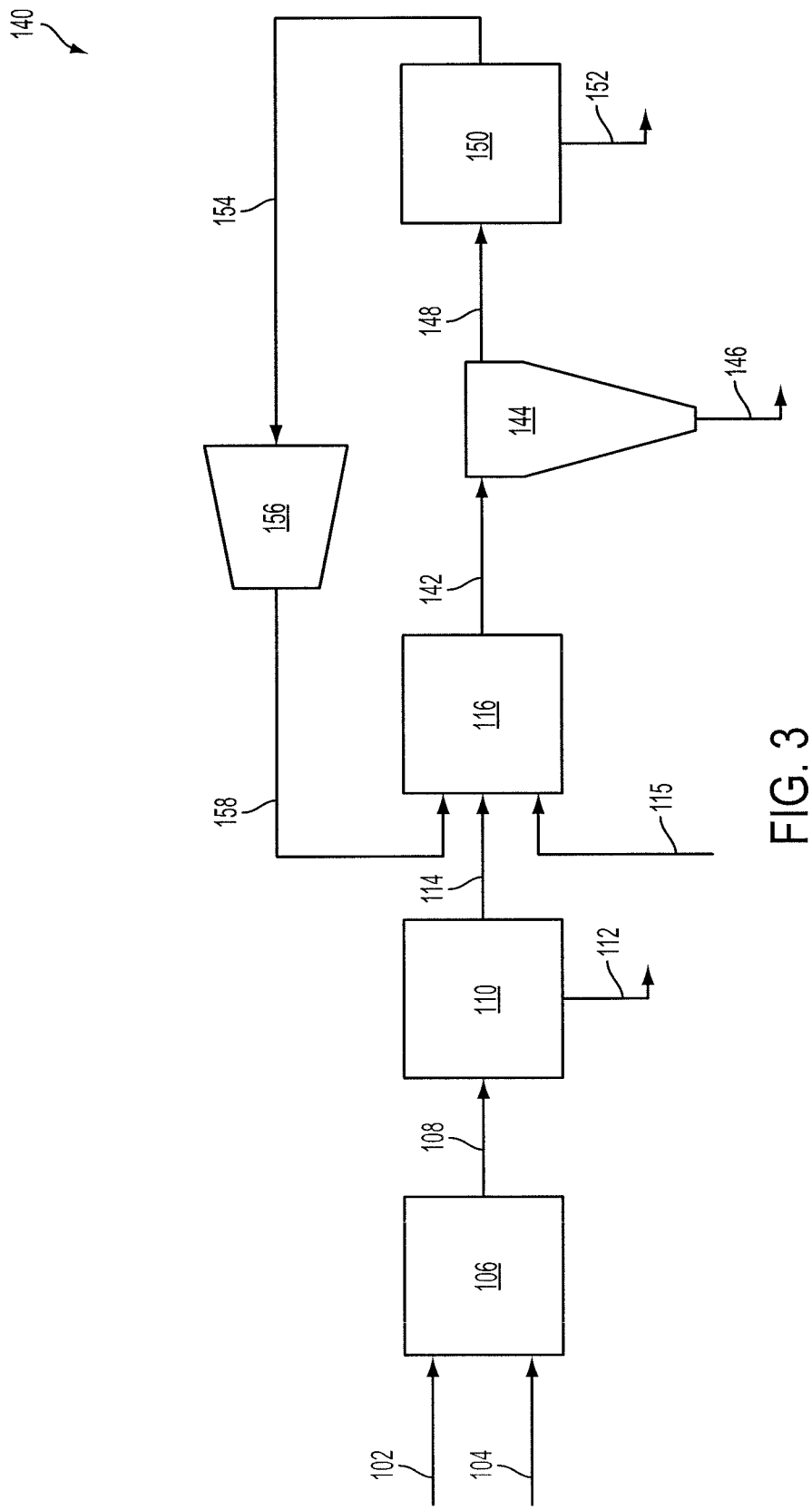

FIG. 3 shows another system 140 that may be used in a method for converting gaseous carbon dioxide to solid carbon. Like the system 100 shown in FIG. 2, the system 140 includes a first reactor 106, a first separator 110, and a second reactor 116. The first reactor 106 and the first separator 110 may operate substantially as described above with respect to FIG. 2.

The dry first reaction product mixture 114 enters the second reactor 116 with one or more of the second reducing agent 115 and a compressed recirculated mixture 158. The second reducing agent 115 may include $H_2$, a hydrocarbon such as $CH_4$, or any mixture thereof.

The second reactor 116 may be any vessel configured to contain, mix, or react the dry first reaction product mixture 114, the second reducing agent 115, and the recirculated mixture 126, for example, a fluidized bed. An output 142 from the second reactor 116 may include reactants and/or products of the reaction, such as solid carbon, CO, $H_2O$, $CO_2$, $H_2$, etc. The output 142 may enter a solid separator 144, where solids 146 may be separated from gases 148. For example, the solid separator 144 may be a cyclone. The solids 146 removed from the gases 148 in the solid separator 144 may include one or more forms of solid carbon, such as graphite (e.g., pyrolytic graphite), graphene, carbon black, fibrous carbon, buckminsterfullerenes, single-wall CNTs, or multi-wall CNTs.

The gases 148 may include products of the reaction of the dry first reaction product mixture 114, the second reducing agent 115, or the compressed recirculated mixture 158, and one or more of the reactants. The gases 148 may enter a condenser 150. The condenser 150 may be configured to separate a condensate 152 from a recirculated mixture 154. The condensate 152 may include water or other condensable matter formed in the second reactor 116 or otherwise present in the gases 148. The recirculated mixture 154 may include gases that do not condense at operating conditions of the condenser 150. For example, the recirculated mixture 154 includes CO or $CO_2$ that has not reacted to form solids 146. The recirculated mixture 154 may enter a compressor 156. The compressor 156 may produce the compressed recirculated mixture 158 by increasing the pressure of the recirculated mixture 154. The pressure increase imparted by the compressor 156 may compensate for pressure drops within the system 140, such as within the second reactor 116, the cyclone 144, or the condenser 150. Though not shown in FIG. 3, the system 140 may include one or more additional compressors configured to provide materials at selected pressures (e.g., a compressor configured to compress the carbon source 102 and/or the reducing agent 104).

Components of the systems 100, 140 shown and described herein may operate at various temperatures and pressures. For example, the first reactor 106 or the second reactor 116 may operate at a temperature of at least 450° C., such as a temperature of at least 650° C., or a temperature of from about 680° C. to about 700° C. The first reactor 106 or the second reactor 116 may operate at a pressure from about 0.28 MPa (40 psi) to about 0.41 MPa (60 psi), or at a pressure of about 4.1 MPa (600 psi). The first separator 110, the second separator 122, the solid separator 144, and the condenser 150 may operate at lower temperatures than the first reactor 106 and/or the second reactor 116. For example, the first separator 110, the second separator 122, the solid separator 144, and the condenser 150 may operate at temperatures of less than about 100° C., less than about 80° C., or even less than about 50° C. In some embodiments, heat may be recovered from one material and transferred to another.

Figure 4:
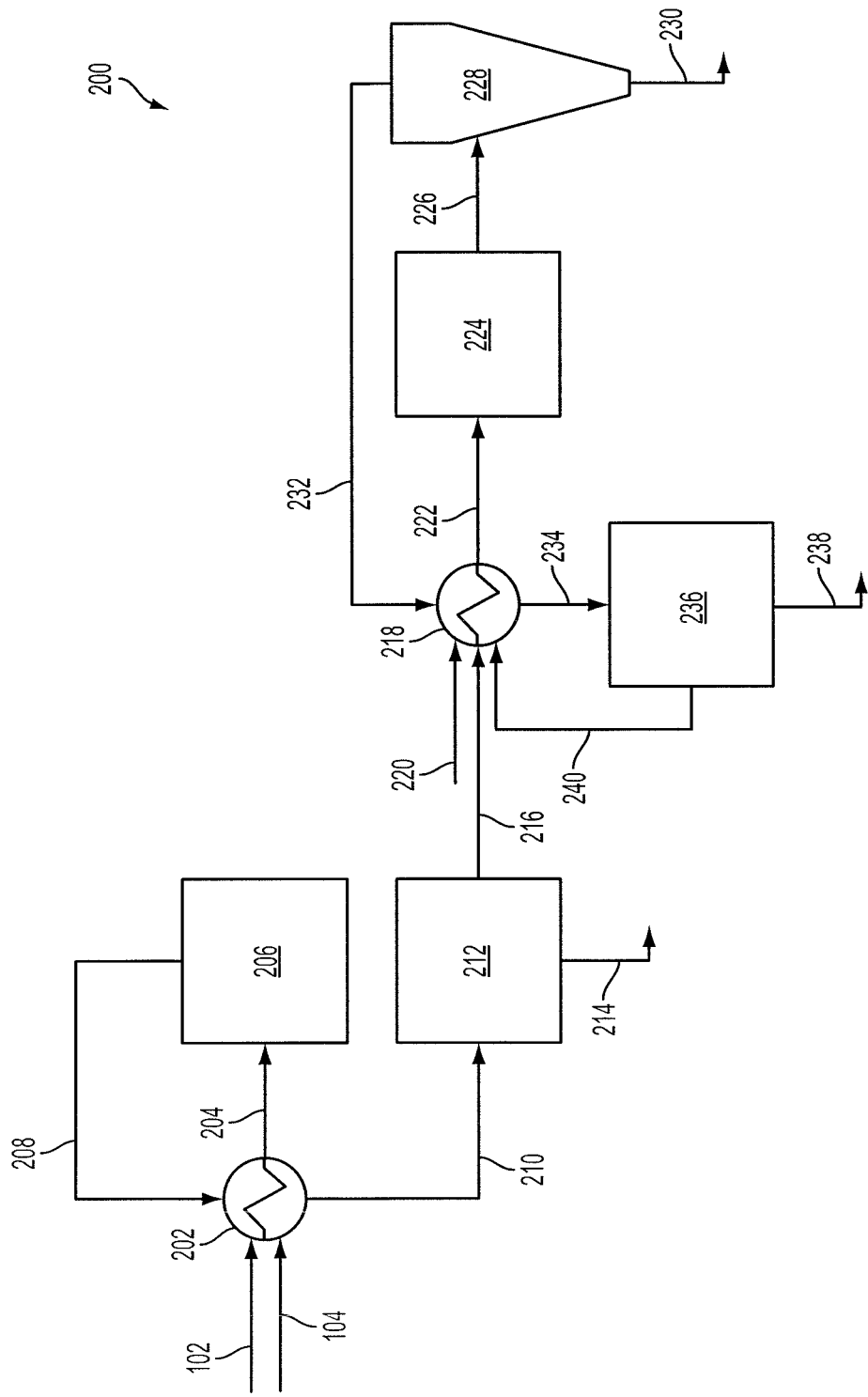

For example, FIG. 4 shows a system 200 having heat-recovery features. A carbon source 102 and a reducing agent 104 enter a first heat exchanger 202. The first heat exchanger 202 may be a shell-and-tube heat exchanger, a plate heat exchanger, a plate-fin heat exchanger, a spiral heat exchanger, or any other type of heat transfer apparatus. The first heat exchanger 202 may be configured to operate in co-current flow, countercurrent flow, or cross flow. The carbon source 102 and the reducing agent 104 may be combined before entering the first heat exchanger 202, within the first heat exchanger 202, or after leaving the first heat exchanger 202. In the embodiment shown in FIG. 4, the carbon source 102 and the reducing agent 104 are mixed within the first heat exchanger 202, and a heated reactant mixture 204 leaves the first heat exchanger 202. The heated reactant mixture 204 may be hotter than either the carbon source 102 or the reducing agent 104 entering the first heat exchanger 202. For example, the heated reactant mixture 204 may be at a temperature of at least 300° C., such as a temperature of at least 500° C., or a temperature of from about 550° C. to about 600° C. The heated reactant mixture 204 may be at a pressure from about 0.28 MPa (40 psi) to about 0.41 MPa (60 psi), or at a pressure of about 4.1 MPa (600 psi).

The heated reactant mixture 204 enters a first reactor 206, which may be similar to the first reactor 106, as shown and described in FIG. 2. That is, the first reactor 206 may be adapted to operate at conditions in which the carbon source 102 and the reducing agent 104 react to form a first reaction product mixture 208. The first reactor 206 may be heated to a temperature higher than the temperature of the heated reactant mixture 204 entering the first reactor 206. For example, the first reactor 206 may be heated to a temperature of at least 450° C., such as a temperature of at least 650° C., or a temperature of from about 680° C. to about 700° C.

The first reaction product mixture 208 may leave the first reactor 206 at approximately the same temperature as the operating temperature of the first reactor 206. The first reaction product mixture 208 returns to the first heat exchanger 202 to recover heat from the first reaction product mixture 208. The heat from the first reaction product mixture 208 is transferred to the carbon source 102 and/or the reducing agent 104. Recovery of heat in the first heat exchanger 202 reduces the heating load necessary to maintain the first reactor 206 at a selected operating temperature. Thus, a system 200 having a first heat exchanger 202 as shown in FIG. 4 may have lower energy costs than a system without such a first heat exchanger 202.

A cooled first reaction product mixture 210 leaves the first heat exchanger 202 at a temperature of less than about 200° C., such as a temperature of less than about 150° C., or a temperature of from about 80° C. to about 120° C., and enters a condenser 212. The condenser 212 separates a condensate 214 (e.g., liquid water) from a dry first reaction product mixture 216 (e.g., gaseous $CO_2$, CO, etc.). The condenser 212 may be similar to the first separator 110, as shown and described in FIG. 2.

The condenser 212 may operate at a temperature of less than about 100° C., less than about 80° C., or even less than about 50° C. The condenser 212 may include one or more cooling means to control the operating temperature. Removal of heat from the first reaction product mixture 208 in the first heat exchanger 202 reduces the cooling load of the condenser 212 by reducing the temperature of the cooled first reaction product mixture 210. Thus, the first heat exchanger 202 may reduce cooling needs of the system 200.

The dry first reaction product mixture 216 enters a second heat exchanger 218, and may be heated or mixed with a reducing agent 220 or a recirculated mixture 240. The second heat exchanger 218 may be a shell-and-tube heat exchanger, a plate heat exchanger, a plate-fin heat exchanger, a spiral heat exchanger, or any other type of heat transfer apparatus. The second heat exchanger 218 may be configured to operate in co-current flow, countercurrent flow, or cross flow. The dry first reaction product mixture 216, the reducing agent 220, and the recirculated mixture 240 may be combined before entering the second heat exchanger 218, within the second heat exchanger 218, or after leaving the second heat exchanger 218. In the embodiment shown in FIG. 4, the dry first reaction product mixture 216, the reducing agent 220, and the recirculated mixture 240 are mixed within the second heat exchanger 218, and a heated second reactant mixture 222 leaves the second heat exchanger 218. The heated second reactant mixture 222 may be hotter than the dry first reaction product mixture 216, the reducing agent 220, or the recirculated mixture 240 entering the second heat exchanger 218. For example, the heated second reactant mixture 222 may be at a temperature of at least about 300° C., such as a temperature of at least about 500° C., or a temperature of from about 550° C. to about 600° C. The heated second reactant mixture 222 may be at a pressure from about 0.28 MPa (40 psi) to about 0.41 MPa (60 psi), or at a pressure of about 4.1 MPa (600 psi).

The heated second reactant mixture 222 enters a second reactor 224, which may be similar to the second reactor 116, as shown and described in FIG. 2. That is, the second reactor 224 may be adapted to operate at conditions in which components of the heated second reactant mixture 222 react to form solid carbon and other products. The reaction products may leave the second reactor 224 as second reaction product mixture 226. The second reactor 224 may be heated to a temperature higher than the temperature of the heated second reactant mixture 222 entering the second reactor 224. For example, the second reactor 224 may be heated to a temperature of at least 450° C., such as a temperature of at least 650° C., or a temperature of from about 680° C. to about 700° C. Recovery of heat in the second heat exchanger 218 may reduce the heating load necessary to maintain the second reactor 224 at a selected operating temperature. Thus, a system 200 having a second heat exchanger 218 as shown in FIG. 4 may have lower energy costs than a system without such a second heat exchanger 218.

The second reaction product mixture 226 may enter a cyclone 228, and solids 230 may be separated from gases 232. The gases 232 enter the second heat exchanger 218, and heat from the gases 232 may be recovered and transferred to the dry first reaction product mixture 216, the reducing agent 220, and/or the recirculated mixture 240. Cooled gases 234 leaving the second heat exchanger 218 enter a second condenser 236, where condensate 238 is separated from the recirculated mixture 240.

The system 200 may include one or more compressors to compensate for the pressure drop within the system 200. For example, pressure drop may occur within the heat exchangers 202, 218, the reactors 206, 224, the condensers 212, 236, cyclone 228, and/or related piping, valves, sensors, controllers, etc.

Separating the process for converting gaseous carbon dioxide into two or more stages, as shown in FIGS. 2 through 4, may have various benefits. For example, because of thermodynamics or kinetics, a single reactor in which the entire conversion process occurs may be technically difficult or economically infeasible for some applications. As described above, the Bosch reaction of carbon dioxide with hydrogen is a two-step reaction. The first reaction:

$$CO_2 + H_2 \leftrightarrow CO + H_2O \qquad \text{(Equation 2)},$$

the reverse water-gas shift reaction, may have a reaction rate much faster than the second reaction. The second reaction:

$$CO + H_2 \leftrightarrow C_{(s)} + H_2O \qquad \text{(Equation 3)},$$

may control the overall reaction rate of the process. By separating the process into two stages, the two reactions may be isolated. The first reactors 106, 206 may be relatively smaller than the second reactors 116, 224, yet the first reaction may still proceed substantially to completion in the first reactors 106, 206. Smaller reactors may be less costly to produce, maintain, and operate.

Furthermore, the removal of condensate between the two reactions may allow the second reaction to occur in an environment having a lower overall water vapor concentration than would occur in a single reactor. A lower water vapor concentration may be beneficial because water is a product of both Equation 2 and Equation 3. Thus, to the extent the reactions are governed by thermodynamics (i.e., by equilibrium conditions), lower water vapor concentrations drive the reactions further to completion (i.e., to the right). Lower water vapor concentrations may also be beneficial in limiting or preventing oxidation of metals (e.g., of reaction vessels or catalysts). Thus, a lower water vapor concentration may contribute to the efficiency of the process and to lower maintenance costs.

A reactor may be coupled with heating and cooling mechanisms to control the temperature of the reactor. For example, a reactor may be configured such that products and excess reactant are recycled through a cooling mechanism to condense water vapor. The products and/or excess reactant may then be reheated and recycled through the reactor. By removing some of the water vapor in the recycled gases, the morphology of solid carbon formed may be controlled. Changing the partial pressure of water vapor changes the carbon activity of a mixture. The reactor may also be coupled to a carbon collector in which water and unreacted reactants are separated from the carbon products. The separated carbon products are collected and removed from the system.

The methods disclosed herein may be incorporated into power production, chemical processes, and manufacturing processes in which the combustion of a primary hydrocarbon fuel source is the primary source of heat. The resulting combustion gases from such processes contain carbon oxides that may act as sources of carbon for the manufacture of the desired solid carbon product. The methods are scalable for many different production capacities so that, for example, plants designed with this method in mind may be sized to handle the carbon oxide emissions from the combustion processes of a large coal-fired power plant or those from an internal combustion engine. For example, the methods may be used to reduce carbon dioxide from the atmosphere, combustion gases, process off-gases, exhaust gases from the manufacture of Portland cement, and well gases, or from separated fractions thereof.

In another embodiment, the carbon oxides from a source gas mixture are separated from the source mixture and concentrated to form the carbon oxide feedstock for the reduction process. The carbon oxides in the source gases may be concentrated through various means known to the art. In yet another embodiment, the catalytic conversion process may be employed as an intermediate step in a multi-stage power extraction process wherein the first stages cool the combustion gases to the reaction temperature of the reduction process for the formation of the desired solid carbon product. The cooled combustion gases, at the desired temperature of the reduction reaction, may then be passed through the reduction process and subsequently passed through additional power extraction stages.

Coupling this method with a hydrocarbon combustion process for electrical power production has the additional advantage that the hydrogen required for the reduction process may be formed by the electrolysis of water using off-peak power. The oxygen formed in the electrolysis process may be used as at least a portion of the combustible mixture for the combustion process.

When the methods disclosed herein are coupled with a combustion or chemical process that uses hydrocarbons, a portion of the hydrocarbons of the process may be used as the reducing agent gas. This may include the pyrolysis of the hydrocarbons to form a hydrogen gas that is provided as the reducing agent gas. The process of this disclosure may be adapted to various available hydrocarbon sources.

Example

Methane gas is mixed with carbon dioxide gas in a ratio of 1:1 inside a first tube furnace lined with a ceramic material, maintained at about 680° C., and containing steel wool therein. The methane gas reacts with the carbon dioxide gas in the presence of the steel wool to form a reaction gas mixture of carbon monoxide, water, and hydrogen. The reaction gas mixture enters a condenser operating at about 50° C. to remove liquid water from the reaction gas mixture. The dried reaction gas mixture enters a second tube furnace lined with a ceramic material, maintained at about 680° C., and containing steel wool therein. The carbon monoxide and hydrogen in the dried reaction gas mixture react in the presence of the steel wool to form single-wall carbon nanotubes and a tail gas mixture of water with some residual hydrogen and carbon monoxide. The carbon nanotubes collect on surfaces of the steel wool. The tail gas mixture enters a condenser operating at about 50° C. to remove liquid water from the tail gas mixture. The dried tail gas mixture is recycled to the second tube furnace.

After the process has proceeded for a period of time, flow of gas is stopped, furnaces and condensers are cooled to room temperature, and the system is purged with an inert gas. The steel wool is removed from the second tube furnace, and the carbon nanotubes are physically removed from the steel wool. Any remaining metal on the carbon nanotubes may be removed, if desired, by washing with acid.

Although the foregoing description contains specific details, these are not to be construed as limiting the scope of the present invention, but merely as providing certain embodiments. Similarly, other embodiments of the invention may be devised which do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A two-stage reaction process comprising:
reacting at least a portion of a first feed gas mixture comprising carbon dioxide with a hydrogen-containing reducing agent under first reaction conditions to convert at least a portion of the first feed gas mixture to a first tail gas comprising carbon dioxide, carbon monoxide, hydrogen, water vapor, and residual hydrogen-containing reducing agent;
condensing at least a portion of the water from the first tail gas to form a dried first tail gas;
reacting at least a portion of the dried first tail gas under second reaction conditions to convert at least a portion of the carbon monoxide in the dried first tail gas to solid carbon and a second tail gas comprising water vapor;
condensing at least a portion of the water from the second tail gas to form a dried second tail gas;
recirculating at least a portion of the dried second tail gas for mixing the dried first tail gas with at least a portion of the dried second tail gas to form the second reaction feed mixture; and
removing the solid carbon from the second reactor.

2. The process of claim 1, wherein reacting at least a portion of the first feed gas mixture comprising carbon dioxide with the hydrogen-containing reducing agent comprises reacting the carbon dioxide with methane.

3. The process of claim 1, wherein reacting at least a portion of the first feed gas mixture comprising carbon dioxide with the hydrogen-containing reducing agent comprises reacting at least a portion of the first feed gas mixture comprising carbon dioxide with hydrogen ($H_2$).

4. The process of claim 1, further comprising venting a portion of at least one of the first tail gas, the dried first tail gas, the second tail gas, and the dried second tail gas to limit accumulation of inert contaminants to a predetermined level.

5. The process of claim 1, wherein the first reaction conditions comprise a pressure from about 40 psi to about 900 psi.

6. The process of claim 1, wherein the first reaction conditions comprise a first temperature and a first pressure, and wherein the second reaction conditions also comprise the first temperature and the first pressure.

7. The process of claim 1, wherein reacting at least a portion of a first feed gas mixture comprising carbon dioxide with a hydrogen-containing reducing agent and reacting at least a portion of the dried first tail gas simultaneously and under the same reaction conditions.

8. A two-stage reaction process for converting gaseous carbon dioxide and hydrogen to solid carbon and water, the process comprising:
   at least partially reacting a first feed gas mixture comprising gaseous carbon dioxide and hydrogen under first reaction conditions to convert at least a portion of the carbon dioxide and the hydrogen therein to carbon monoxide and water vapor in a first tail gas;
   condensing at least a portion of the water from the first tail gas to form a dried first tail gas;
   mixing the dried first tail gas with a dried second tail gas to form a second feed gas mixture;
   at least partially reacting the second feed gas mixture under second reaction conditions to convert at least a portion of carbon oxides in the second feed mixture to solid carbon and a second tail gas comprising water and unreacted gases from the second feed mixture;
   removing solid carbon from the second tail gas; and
   condensing at least a portion of the water from the second tail gas to form the dried second tail gas.

9. The process of claim 8, wherein reacting a first feed mixture comprises reacting the first feed mixture in a first reaction zone, and reacting the second feed mixture comprises reacting the second feed mixture in a second reaction zone.

10. The process of claim 8, wherein at least partially reacting a first feed gas mixture comprises incomplete reaction of the first feed gas mixture to form the first tail gas comprising carbon dioxide, carbon monoxide, hydrogen, and water.

11. The process of claim 8, wherein the solid carbon comprises carbon nanotubes and at least one other form of solid carbon.

12. The process of claim 11, wherein at least partially reacting a second feed gas mixture comprises at least partially reacting the second feed gas mixture with the at least one other form of solid carbon to form a second tail gas comprising carbon dioxide, carbon monoxide, hydrogen, methane, and water.

13. A method for two-stage reduction of carbon dioxide, the method comprising:
   partially reacting a feed gas mixture comprising carbon dioxide and a reducing gas to form a reaction mixture comprising carbon monoxide and water;
   condensing at least a portion of the water from the reaction mixture to form a dried reaction mixture;
   mixing the dried reaction mixture with a recirculating gas stream to form a catalytic converter feed gas mixture;
   flowing the catalytic converter feed gas mixture through a catalytic converter in the presence of a catalyst to form solid carbon and a tail gas comprising water;
   flowing the tail gas through a heat exchanger to condense a portion of the water therefrom and form the recirculating gas stream; and
   removing the solid carbon from the catalytic converter.

14. The method of claim 13, wherein flowing the catalytic converter feed gas mixture through a catalytic converter in the presence of a catalyst comprises converting at least a portion of the carbon monoxide and at least a portion of the reducing gas to solid carbon and water.

15. The method of claim 13, wherein flowing the catalytic converter feed gas mixture through a catalytic converter in the presence of a catalyst comprises forming carbon nanotubes and other forms of solid carbon.

16. The method of claim 13, wherein the reducing gas comprises at least one material selected from the group consisting of hydrogen, hydrocarbons, and alcohols.

17. The method of claim 13, further comprising separating the solid carbon from the tail gas mixture.

18. The method of claim 13, wherein flowing the catalytic converter feed gas mixture through a catalytic converter in the presence of a catalyst comprises converting at least a portion of the carbon dioxide and at least a portion of solid carbon to carbon monoxide.

19. The method of claim 13, wherein the catalytic converter feed gas mixture comprises hydrogen.

20. The method of claim 13, further comprising venting a portion of the recirculating gas stream to limit accumulation of inert constituents to a predetermined level.

* * * * *

UNITED STATES PATENT AND TRADEMARK OFFICE
CERTIFICATE OF CORRECTION

| | | Page 1 of 1 |
|---|---|---|
| PATENT NO. | : 9,637,382 B2 | |
| APPLICATION NO. | : 14/806401 | |
| DATED | : May 2, 2017 | |
| INVENTOR(S) | : Dallas B. Noyes | |

It is certified that error appears in the above-identified patent and that said Letters Patent is hereby corrected as shown below:

In the Specification

Column 2, Line 3, change "foul's of solid" to --forms of solid--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*